(12) United States Patent
Wu

(10) Patent No.: US 6,519,042 B1
(45) Date of Patent: Feb. 11, 2003

(54) INTERFEROMETER SYSTEM FOR DISPLACEMENT AND STRAIGHTNESS MEASUREMENTS

(75) Inventor: Chien-Ming Wu, Hsinchu (TW)

(73) Assignee: Industrial Technology Research Institute, Hsinchu (CN)

( * ) Notice: Subject to any disclaimer, the term of this patent is extended or adjusted under 35 U.S.C. 154(b) by 281 days.

(21) Appl. No.: 09/648,595

(22) Filed: Aug. 25, 2000

(51) Int. Cl.[7] ................................................. G07B 9/02
(52) U.S. Cl. ...................................................... 356/487
(58) Field of Search ................................ 356/487, 486, 356/490

(56) References Cited

U.S. PATENT DOCUMENTS

| | | |
|---|---|---|
| 3,656,853 A | 4/1972 | Bagley et al. |
| 3,790,284 A | 2/1974 | Baldwin |
| 4,688,940 A | 8/1987 | Sommargren et al. |
| 4,787,747 A * | 11/1988 | Sommargen et al. ....... 356/487 |
| 5,026,163 A | 6/1991 | McMurtry et al. |
| 5,331,400 A | 7/1994 | Wilkening et al. |
| 5,757,491 A | 5/1998 | Cai et al. |
| 6,137,574 A * | 10/2000 | Hill ............................ 356/486 |

OTHER PUBLICATIONS

R.C. Quenelle, "Nonlinearity in interferometer measurements," *Hewlett Packard J.* vol. 34, pp. 10 (1983).
C. M. Sutton, "Nonlinearity in length measurements using heterodyne laser Michelson interferometry," *J. Phys. E: Sci. Instrum.* vol. 20, pp. 1290–1292 (1987).
W. Hou and G. Wilkening, "Investigation and compensation of the nonlinearity of heterodyne interferometers," Precision Eng. vol. 14, pp. 91–98 (1992).
C. M. Wu and R. D. Deslattes, "Analytical modeling of the periodic nonlinearity in heterodyne interferometry," *Appl. Opt.* vol. 37, pp. 6696–6700 (1998).

* cited by examiner

Primary Examiner—Samuel A. Turner
Assistant Examiner—Patrick Connolly
(74) Attorney, Agent, or Firm—Senniger, Powers, Leavitt & Roedel

(57) ABSTRACT

A laser interferometer system based on three design principles, the heterodyne frequency, the avoiding mixing, and the perfect symmetry, is described. These design principles give rise to the interferometer a high stable system with no periodic nonlinearity. This system is capable of providing both displacement and straightness measurements. The arrangement of invention employs a single frequency stabilized input beam from a laser source which is provided to a frequency-shifted means for converting the input beam into a pair of spatial-separated beams having the same optical properties but different optical frequencies. Two identical energy splitters further split the spatial-separated beams into a pair of measurement beams and a pair of reference beams respectively. The measurement beams are incident onto the measurement target and reference target respectively. The returning beams from both measurement and reference targets are redirected by a measurement branch and then make interference with the reference beams, respectively, at a reference branch. The interfered beams then are provided to a set of photo-receivers to produce an interferometric measurement signal and an interferometric reference signal. These electrical signals are processed in a phase meter to produce an output signal which is proportional to the optical path difference (OPD) between the measurement target and the reference target. To measure the straightness errors of a moving carriage, both measurement and reference targets are replaced by a straightness prism and a straightness reflector, respectively.

10 Claims, 3 Drawing Sheets

INTERFEROMETER SYSTEM FOR DISPLACEMENT AND STRAIGHTNESS MEASUREMENTS

BACKGROUND OF THE INVENTION

1. Filed of the Invention

The present invention relates to a laser interferometer system. Particularly, the invention relates to a laser interferometer system of high stability without periodic nonlinearity. More particularly, the invention relates to a laser interferometer system for both displacement and straightness measurements. The main applications of the system are in the fields of scientific research, precision engineering, nanometrology, and characterization of MEMS.

2. Description of the Prior Art

Laser interferometry is nowadays widely used in length-relate measurements in precision engineering, metrology, and lithography applications, as well as in advanced scientific applications. The typical prior art for heterodyne interferometry is schematically shown in FIG. 1, see for example, Bagley et al, U.S. Pat. No. 3,656,853, issued Apr. 18, 1972; Sommargren et al, U.S. Pat. No. 4,688,940, issued Aug. 25, 1987. The output laser beam consists of a pair of nominally orthogonal, linearly polarized beams having different frequencies. The properties of having two frequencies and two polarizations in a coaxial beam simplify the design for interferometer unit. However, it leads to produce the periodic non-linearity caused by the mixings of both frequency and polarization, which limits the accuracy of displacement measurements at the nanometer level.

The periodic non-linearity of heterodyne interferometry was first studied by Quenelle, Hewlett Packard J. Vol. 34, pp. 10 (1983), who predicted the worst case error for measurements made using the HP laser interferometer to be about 5 nm. Direct experimental verification was obtained by Sutton, J. Phys. E: Sci. Instrum. Vol. 20, pp. 1290–1292 (1987). A prior art showing that the first-order non-linearity could be compensated for a heterodyne interferometer was reported by Hou and Wilkening, Precision Eng. Vol. 14, pp.91–98 (1992) and by Wilkening et al, U.S. Pat. No. 5,331,400, issued Jul. 19, 1994; the second-order non-linearity could not be compensated by the approach is a major drawback.

For measuring the straightness error, a typical prior art is shown in FIG. 2 (for example as manufactured by Hewlett-Packard and described in U.S Pat. No. 3,790,284), in which a Wollaston prism is used to split the incident input beam traveling along the principal axis into two secondary beams, each one with a different frequency and polarization. The two secondary beams, deviating from each other at an angle alpha, travel to a straightness reflector. The two returned beams from the straightness reflector are back along their incoming paths, respectively, and then make interference in the Wollaston prism along the principal axis. This system has certain disadvantages. First, it is not a symmetrical design for the Wollaston is quite different from the straightness reflector in shape, material, and other properties. Second, the angle from the straightness reflector is hard to match the divergent angle alpha of the two secondary beams. Third, mixings from both the frequency and polarization are not avoided, resulting in periodic nonlinearity.

Other prior art systems, such as those disclosed in U.S. Pat. Nos. 4,787,747, 5,026,163, and 5,757,491, are complex and asymmetric in their interferometer set-ups, so that most of them are not able to be commercialized.

SUMMARY OF THE INVENTION

An object of the present invention is to provide an interferometer system having a high stability with no periodic nonlinearity while capable of providing both displacement and straightness measurements. The laser interferometer system bases upon three design principles, the heterodyne frequency, the avoiding mixing, and the perfect symmetry.

In accordance with an embodiment of the present invention, a laser interferometer system capable of measuring accurately both changes in optical path length and changes in displacement is disclosed which comprises: (1) a light source of a single stabilized frequency input beam, preferably a linearly polarized laser output; (2) frequency-shifted means, preferably two acousto-optic modulators, for converting the input beam into a pair of spatial-separated beams having different optical frequencies; (3) splitting means, preferably a pair of energy beam splitters, for converting one of the spatial-separated beams into a pair of measurement beams and the other into a pair of reference beams; (4) a measurement branch, preferably including a beam splitter, a quarter wave plate, a fixed target, and a moving target, for redirecting the measurement beams and then ready for further interfering with other beams; (5) interferometric means, preferably a beam combiner, for making interference of measurement beams and reference beams so as to formn a pair of interferometric measurement beams and a pair of interferometric reference beams; (6) receiving means, preferably a pair of photo-receivers, for converting the interferometric measurement beams and the interferometric reference beams into an interferometric measurement signal and an interferometric reference signal respectively; and (7) accumulating means, preferably a phase comparator/accumulator, for providing an output signal based on the difference in phase between the reference signal and the measurement signal.

In accordance with another embodiment of the present invention, a laser interferometer system capable of measuring accurately both changes in optical path length and in transverse displacement is disclosed which comprises: (1) a light source of a single stabilized frequency input beam, preferably a linearly polarized laser output; (2) frequency-shifted means, preferably two acousto-optic modulators, for converting the input beam into a pair of spatial-separated beams having different optical frequencies; (3) splitting means, preferably a pair of energy beam splitters, for converting one of the spatial-separated beams into a pair of measurement beams and the other into a pair of reference beams; (4) a measurement branch, preferably including a beam splitter, a quarter wave plate, a straightness prism for converging and then diverging the measurement beams, and a straightness reflector having the same shape as the straightness prism but with high reflection coating on the far-end side for re-converging the diverging beams to parallelism and then reflecting back the beams along their incoming paths; (5) interferometric means, preferably a beam combiner, for making interference of measurement beams and reference beams so as to form a pair of interferometric measurement beams and a pair of interferometric reference beams; (6) receiving means, preferably a pair of photo-receivers, for converting the interferometric measurement beams and the interferometric reference beams into an interferometric measurement signal and an interferometric reference signal respectively; and (7) accumulating means, preferably a phase comparator/accumulator, for providing an output signal based on the difference in phase between the reference signal and the measurement signal.

In accordance with the present invention, the laser interferometer systems is capable of measuring accurately changes in optical path length in both displacement and transverse displacement with no periodic nonlinearity through the following steps of method: (1) producing a stabilized single optical input beam from a light source; (2) producing a pair of spatial-separated beams of which the optical properties are the same but with respect to frequency (i.e. heterodyne frequency), in which there is no frequency cross talk to each other (i.e. avoiding mixing); (3) producing a pair of measurement beams from one of the spatial-separated beams having identical optical properties and no polarization cross talk to each other (i.e. avoiding mixing) for both measurement and reference targets or straightness prism and reflector (i.e. perfect symmetry); (4)producing a pair of reference beams from the other of the spatial-separated beams having identical optical properties and no polarization cross talk to each other (i.e. avoiding mixing); (5) interfering the measurement beams with the reference beams, separatively, to form two interferometric reference beams and two interferometric measurement beams in a perfect symmetrical manner; (6) producing a pair of electrically interferometric signals by means of coupling photo-receiver means to receive an interferometric measurement beam and an interferometric reference beam; and (7) producing an output signal, which is proportional to the changes in optical path length between the interferometric measurement signal and the interferometric reference signal, the output signal having substantially eliminated the periodic non-linearity by means of avoiding the frequency cross talk and polarization cross talk on the interferometric measurement and reference beams.

The advantages and features of this invention can be easily comprehended by persons skilled in the art through the drawings and detailed explanations.

DETAILED DESCRIPTIONS OF EMBODIMENTS

The best presently known mode for carrying out the invention is a laser interferometer for both displacement and transverse displacement measurements having a pair of spatial-separated laser beams without frequency cross talk and further generating a pair of measurement beams and a pair of reference beams both having no polarization cross talk. Such a laser interferometer gives rise to a free of contaminated terms in interferometric signals that prevent most of the periodic non-linearity present in traditional interferometers.

Figure 1:
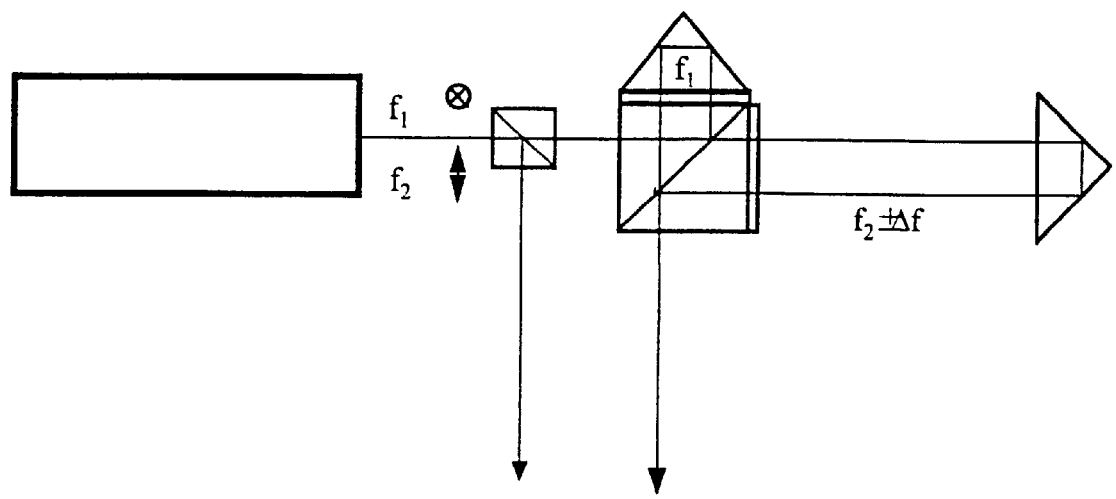
FIG. 1 is a schematic diagram of a prior art for displacement measurement.
Figure 2:
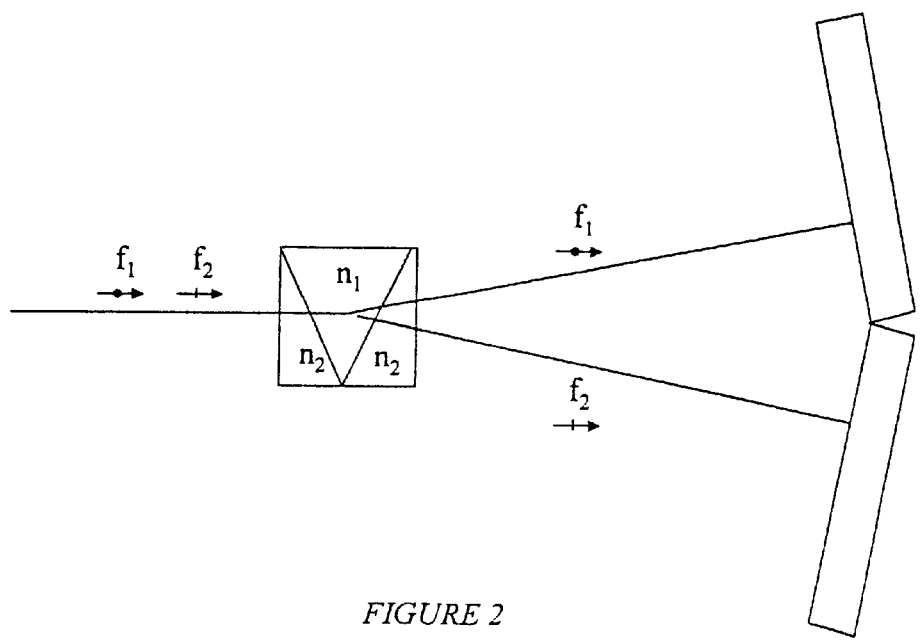
FIG. 2 is a schematic diagram of a prior art for straightness measurement.
Figure 3:
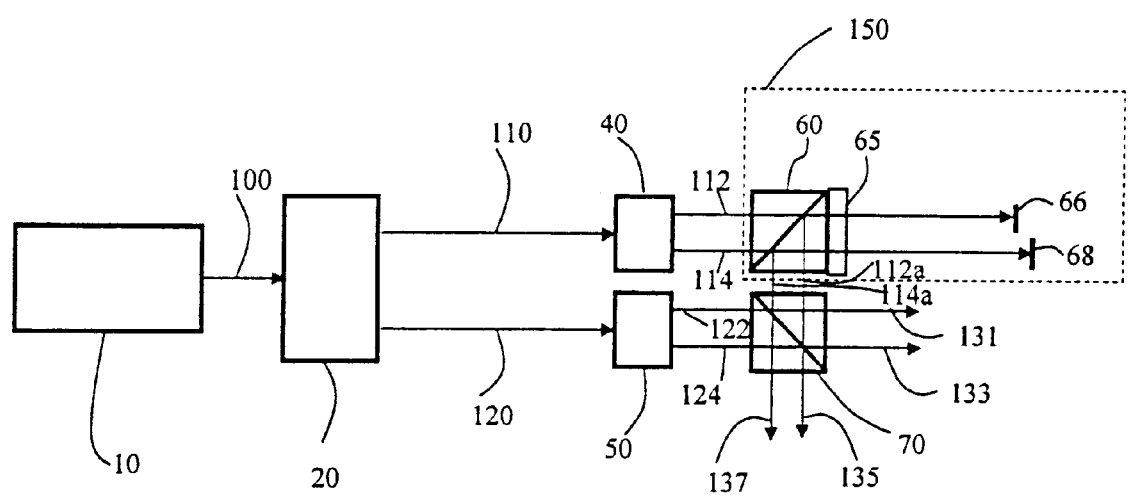
FIG. 3 is a schematic diagram of an embodiment of the present invention for both displacement and straightness measurements.

FIG. 3 depicts in schematic form an embodiment of the present invention. A light source 10, preferably a laser, emits a mono-frequency beam 100. The input beam 100 can be either a linearly polarized beam or a circular beam. Frequency-shifted means 20 comprises a set of optical components and, if any, a set of electronic devices to generate a pair of spatial-separated beams 110 and 120 having identical optical properties but the frequency. For example, the frequency-shifted means 20 comprises a beam splitter (not shown), for converting said input beam into a pair of nominally identical beams, and a pair of acousto-optical modulators (not shown) to receive said identical beams, respectively to generate two spatial-separated beams at different frequencies. The frequency-shifted means 20 further comprises a pair of optical fibers (not shown) for carrying said pair of spatial-separated beams. Because the beams 110 and 120 are spatial-separated, they are free of frequency mixing. In addition, since they are identical in polarization they are free of polarization mixing.

As shown in FIG. 3, beams 110 and 120 are incident into a splitting means, preferably a pair of energy beam splitters 40 and 50, for respectively converting one of the spatial-separated beams 110 into a pair of measurement beams 112 and 114 and the other into a pair of reference beams 122 and 124. Beams 112 and 114 are substantially identical, in their intensity and frequency, and so are beams 122 and 124 so that both of them contain no frequency cross talk and polarization cross talk. However, the measurement beams 112 and 114 can be of the same polarization state or different polarization states, so can be the reference beams 122 and 124. Each of the energy beam splitter 40 or 50 has the same optical components and is arranged to have one input and two spatially separated outputs. The same optical components include, for example, a pair of Wollaston prisms (not shown) and a pair of focusing lenses (not shown). Moreover, a right-angle prism (not shown) and a displacing prism are attached selectively and preferably.

Beam 112 passes through a polarizing beam splitter 60, and an optical retarder 65, preferably a quarter wave plate, and then is reflected by a fixed target 66, preferably a plan mirror or a retro-reflector. The polarizing beam splitter 60 and the optical retarder 65 can be replaced with two right-angle prisms. After the reflected beam 112 passes through the retarder 65 again, the polarization state of beam 112 is rotated 90° so that the beam 112 can be deflected. (instead of passing through) as beam 112a by the polarizing beam splitter 60. The beam 114 proceeds similar process as above except that it impinges onto a moving target 68 instead of a fixed target 66. The above components construct a beam redirecting means 150 and form a measurement branch and a reference branch. Means 150 represents the interferometer unit for the present embodiment. Furthermore, means 150 represents a high-stabilized differential interferometer unit because the measurement beams 112 and 114 are close to each other and they both traverse the same path length over optical components and almost the same path length over free space; the only difference is what we need: the displacement of moving target 68.

There are two small amounts of leakage occurred when the beam passes through and is deflected at the polarizing surface of the polarization beam splitter 60, respectively. The leakages do not contaminate beams 112a and 114a because they are traveling in opposite direction or out off 90° to beams 112a and 114a. In contrast with the present invention, those leakages do contaminate the measurement beam in the prior art, see for example, Bagley et al, U.S. Pat. No. 3,656,853, issued Apr. 18, 1972; Sommargren et al, U.S. Pat. No. 4,688,940, issued Aug. 25, 1987. Furthermore, the polarization beam splitter 60 does not intend to separate a pair of coaxial, orthogonally linearly polarized beams, as used in prior arts, see for example, Bagley et al, U.S. Pat. No. 3,656,853, issued Apr. 18, 1972; Sommargren et al, U.S. Pat. No. 4,688,940, issued Aug. 25, 1987, so that there are no frequency and polarization contamination into beams 112a and 114a.

Beams 112a and 114a are interfered with two reference beams 122 and 124 by means of an interferometric means 70 respectively. The interferometric means 70 preferably comprises a beam splitter (not shown), particularly a polarizing beam splitter, a quarter wave plate (not shown), and a retro-reflector (not shown). Thus four interferometric beams 131, 137, 133, and 135 are formed; beams 131 and 137 are interferometric measurement beams and beams 133 and 135 are interferometric reference beams; all of them are free of contamination of frequency and polarization cross talks. Either one of the interferometric measurement beams and the interferometric reference beams are fed into a set of photo-receivers (not shown) used for converting the interferometric optical beams into interferometric electrical signals, in the form as follows.

$$I_m \cos[\Delta\omega t + \phi(t)]$$

for measurement signal and the form $$I_r \cos(\Delta\omega t)$$

for reference signal where $$\Delta\omega = 2\pi|f_m - f_r|$$

and $$\phi(t) = 2\frac{2\pi}{\lambda} \int dt v(t), \ v(t): \text{Velocity of the moving target}$$
$$= 2\frac{2\pi}{\lambda} s(t)$$

In accordance with the equation above, it follows that the displacement s(t) of the moving target is directly proportional to the phase $\phi(t)$ which is measured through an accumulating means (not shown), preferably a phase comparator/accumulator. Thus the displacement of the distance traversed is reduced to an electrical phase signal.

Figure 4:
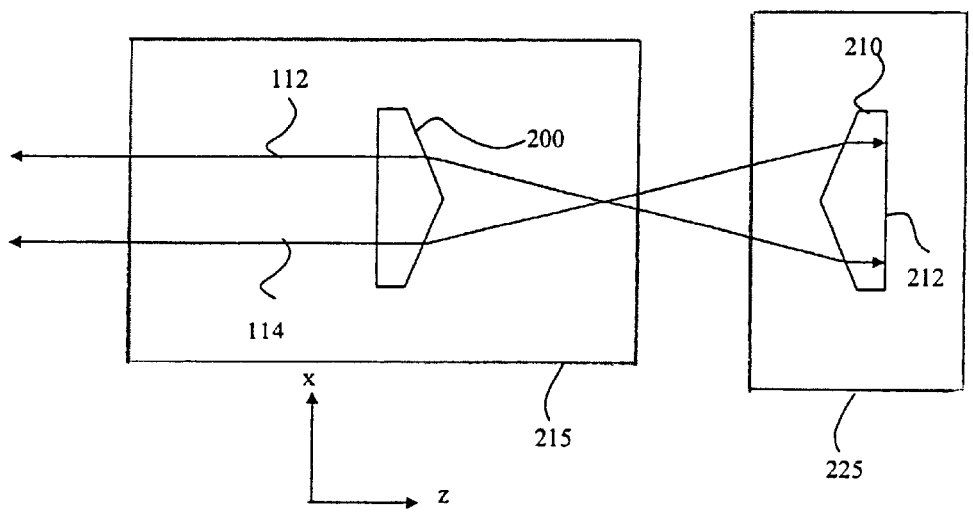
FIG. 4 is a schematic diagram of an embodiment of the present invention for straightness measurement.
Figure 5:
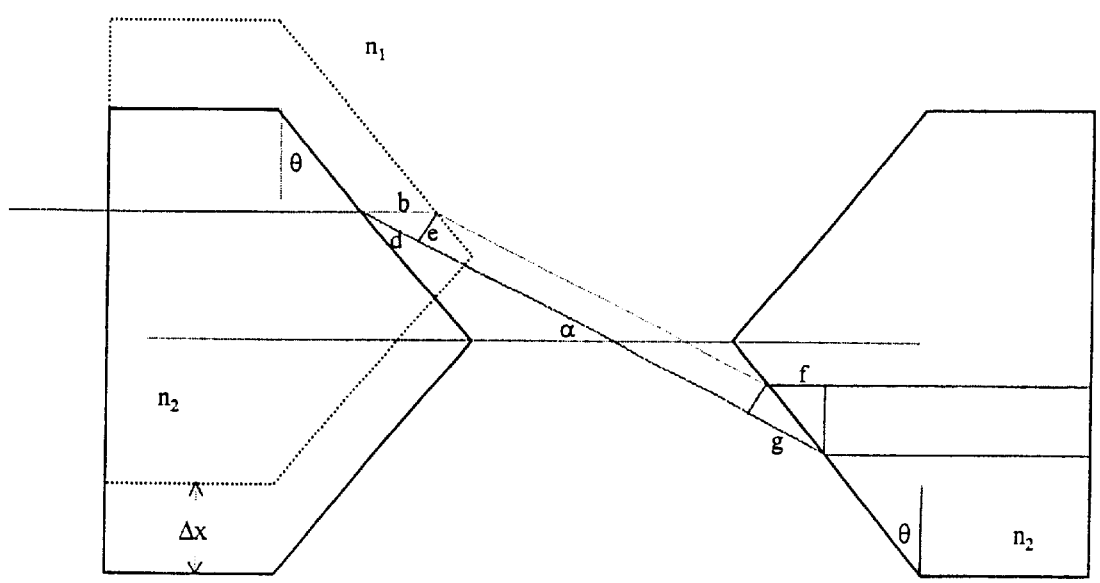
FIG. 5 is a view of optical path arrangement in FIG. 4 for calculating the optical path length changes caused by a relative transverse displacement between the straightness prism and the straightness reflector.

FIG. 4 schematically illustrates a second embodiment according to this invention. Substituting the fixed target 66 and moving target 68, which are used in displacement measurements, with a straightness branch as shown in FIG. 4 comes a laser interferometer system for straightness measurements. As shown in FIG. 4, the measurement beams 112 and 114 are now converged as passing through a straightness prism 200. The converged beams, later becoming; two divergent beams, travel to a straightness reflector 210. The straightness reflector 210 reflects back them on the far-end side 212 coated with high reflection film along the incoming traces. To measure the transverse displacements of a carriage 215 moving in the ±z directions, the straightness prism 200 can be clamped on the top of carriage and the straightness reflector 210 can be fixed onto a stationary stand 225 as shown in FIG. 4. When the carriage moves, a transverse displacement (straightness error) will occur. The change of optical path length for one of the two measurement beams for a unit transverse displacement, Δx, is shown in FIG. 5. Because of the equality of optical path length for g and f in FIG. 5, the only difference before and after the transverse movement, Δx, is $n_2 b - n_1 d$. Given α, θ, $n_1$ and $n_2$, the optical path length of b is $n_2 \Delta x \tan\theta$ and the that of d is $n_1 \Delta x \tan\theta \cos\alpha$. The optical path difference is $n_2 b - n_1 d = \Delta x \tan\theta (n_2 - n_1 \cos\alpha)$. The other measurement beam has the same value with an the opposite sign. Combining these two beams gives a double gain.

Based on the report of Wu et al, *Appl. Opt.* 7, 6696–6700 (1988), the periodic non-linearity of interferometers is mainly from the frequency mixing and the polarization mixing which result from using co-linear, orthogonally linearly polarized laser beams and leakage-contaminated polarizing beam splitter. The present invention is arranged to avoid such mixings and leakage so that, in principle, free of periodic non-linearity can be obtained. However, ghost reflections present on the interfaces of optical components used introduce small amounts of periodic non-linearity error. The residual periodic non-linearity below 15 picometers was observed in the present invention. By paying careful attention to such parasitic effects, it is expected that the remaining errors can be brought down to the level of resolution of the phase determination electronics.

The principal advantages of the present invention are: (1) applicable to both displacement and straightness displacement, (2) a differential heterodyne interferometer system that is insensitive to DC-level and changes of intensity, and immunize to common-mode errors, (3) avoiding frequency and polarization mixings, and has no contaminations from leakage, resulting in free of periodic nonlinearity, (4) a perfect symmetric design which benefits in high stability and low noise.

While the preferred embodiments of the invention have been disclosed, obviously modification can be made therein, without departing from the scope of the invention as defined in the following claims.

What is claimed is:

1. An interferometer system for transverse displacement measurements comprising:

a light source for providing a stabilized input beam;

a frequency-shifted means for receiving and converting said input beam into a pair of spatial-separated beams each having a different optical frequency;

splitting means for converting one of said spatial-separated beams into a pair of measurement beams and the other into a pair of reference beams;

beam redirecting means including a beam splitter, a quarter wave plate, a straightness prism for converging and then diverging the measurement beams, and a straightness reflector having the same shape with the straightness prism but with high reflection coating on a far-end side for re-converging the diverging beams to parallelism and then reflected back the beams along their incoming paths;

interferometric means to receive said measurement beams and said reference beams for making interference and then to form the interferometric measurement and reference beams;

receiving means to convert said interferometric measurement and reference beams into an interferometric measurement signal and an interferometric reference signal, respectively; and accumulating means for providing an output signal based on the difference in phase between said interferometric reference signal and said interferometric measurement signal.

2. The interferometer system in accordance with claim 1, wherein said frequency-shifted means comprises an acousto-optical modulator to receive said input beam to generate two spatial-separated beams with different frequencies.

3. The interferometer system in accordance with claim 1, wherein said frequency-shifted means comprises a beam splitter, for converting said input beam into a pair of nominally identical beams, and a pair of acousto-optical modulators to receive said identical beams, respectively to generate two spatial-separated beams with different frequencies.

4. The interferometer system in accordance with claim 1, wherein said frequency-shifted means further comprises a pair of optical fibers for carrying said pair of spatial-separated beams.

5. The interferometer system in accordance with claim 1, wherein said pair of spatial-separated beams have the same polarization state.

6. The interferometer system in accordance with claim 1, wherein said splitting means comprises two sets of identically optical components, each one being arranged to have one input and two-spatially separated outputs.

7. The interferometer system in accordance with claim 1, wherein said splitting means comprises a pair of energy beam splitters.

8. The interferometer system in accordance with claim 1, wherein said measurement beams have the same polarization state and said reference beams have the same polarization state also.

9. The interferometer system in accordance with claim 1, wherein said measurement beams have the same frequency and said reference beams have the same frequency also.

10. The interferometer system in accordance with claim 1, wherein said interferometric means comprises a beam splitter.

* * * * *